April 13, 1965 F. C. TROMEL 3,177,649
EXHAUST MANIFOLDS
Filed March 8, 1963
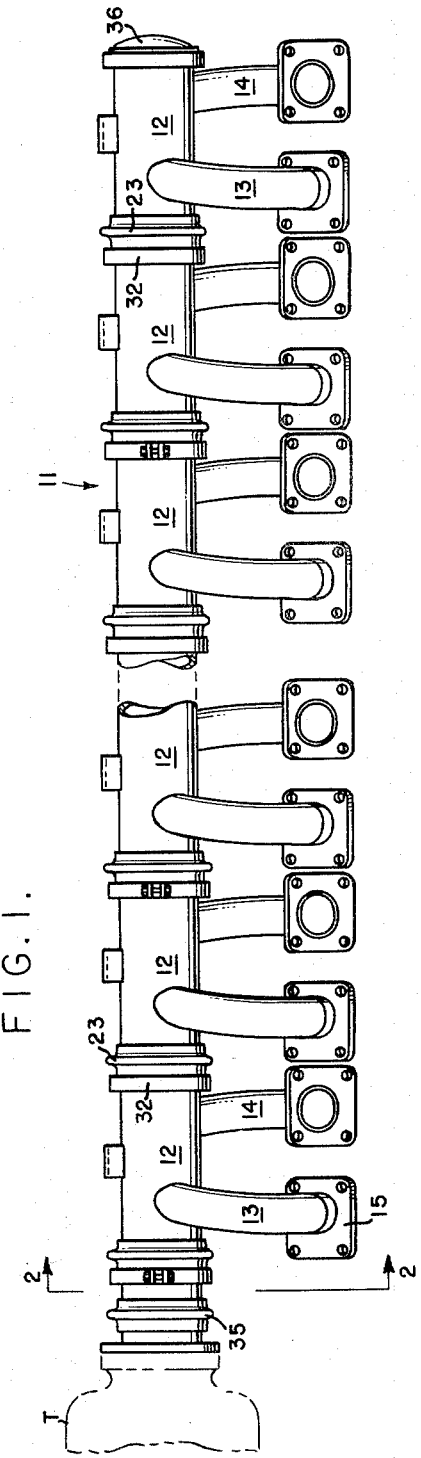
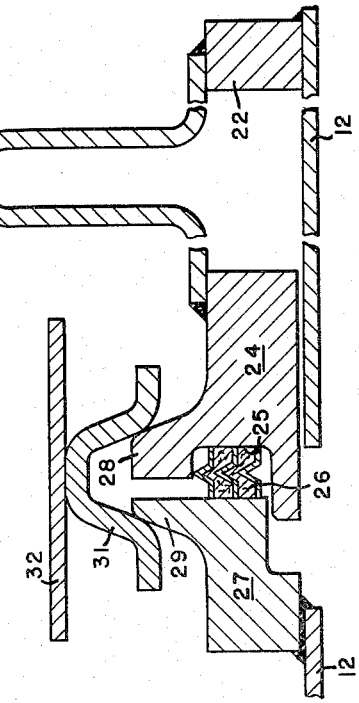
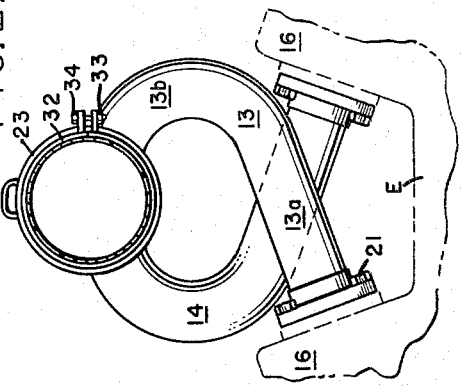
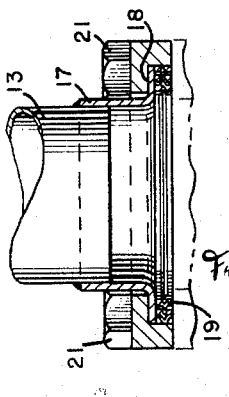
INVENTOR.
Frederic C. Tromel

United States Patent Office 3,177,649
Patented Apr. 13, 1965

3,177,649
EXHAUST MANIFOLDS
Frederic C. Tromel, Schenectady, N.Y., assignor to Alco Products, Incorporated, New York, N.Y., a corporation of Delaware
Filed Mar. 8, 1963, Ser. No. 263,968
6 Claims. (Cl. 60—29)

This invention relates to exhaust manifolds for internal combustion engines and particularly to manifolds for supercharged Diesel engines.

It is known that the use of a single duct exhaust manifold on a supercharged internal combustion engine results in lower fuel consumption and more even loading of the individual cylinders than the multiple duct manifolds now in common use. However, on relatively large V-type engines, a single duct manifold having branches secured to the cylinders on both sides of the engine has generally proven unsatisfactory for many reasons. First, such a manifold creates expansion problems which result in cracking of the joints between the branch pipes and the main conduit and warping of the entire assembly due to thermal expansion. Another important reason that a single duct manifold is not used is that during acceleration and loading of the engine, the exhaust smoke is intolerable and fuel consumption extremely inefficient. This latter problem has been overcome, however, by the use of an air-fuel ratio control device.

The principal object of the present invention, therefore, is to provide a pressure tight single duct exhaust manifold for a supercharged internal combustion engine which compensates for both longitudinal and transverse expansion of its components in relation to the engine.

Another object of the invention is to provide such a manifold having integral branch pipes arranged so as to compensate for expansion between the main conduit and the cylinder heads to prevent warping and cracking of the joints.

A further object is to provide a pressure tight exhaust manifold assembly in which the branch pipes extend from the main conduit and cross over to the opposite side of the engine for securement to the cylinder heads in such manner so as to compensate for thermal expansion.

Another object is to provide such a manifold comprising a plurality of identical and interchangeable components which may be removed and replaced without the removal of the entire assembly.

A further object is to provide such an exhaust manifold assembly which reduces stress at the welded joints due to expansion and vibration to a minimum.

Another object is to provide a pressure tight exhaust manifold assembly in which the length and shape of the branch pipes between the main conduit and the cylinder heads is sufficient to reduce the stress due to thermal expansion to acceptable levels.

A further object is to provide such a manifold in which the branch pipes are secured to the cylinder heads in such manner so as to permit them to rotate or pivot thereon to compensate for thermal expansion of the main conduit to prevent cracking of the joints.

Other and further objects of the present invention will become apparent from the following description, the accompanying drawings, and the appended claims.

In the drawings,

FIG. 1 is a foreshortened elevation view showing the manifold of the present invention;

FIG. 2 is a sectional view taken on line 2—2 of FIG. 1;

FIG. 3 is an enlarged sectional view showing the bellows and seal arrangement between adjacent sections of the main conduit; and, FIG. 4 is an enlarged sectional view showing the sealing arrangement of the branch pipes on the cylinder heads.

The invention consists generally of a relatively long single duct exhaust manifold for a supercharged Diesel engine which conducts the exhaust gases from the engine cylinders to a turbosupercharger. As shown in FIG. 1, the manifold assembly includes a main conduit, generally indicated at 11, comprised of a plurality of main conduit sections 12. All sections 12 are identical and have the same reference numerals. Therefore, only one of such sections will be described. Each main conduit section 12 includes two integral branch pipes 13 and 14 adapted for securement by bolting flanges 15 to the cylinder heads 16 of the engine E as hereinafter more fully described.

As shown in FIG. 2, branch pipes 13 and 14 extend from a cylinder head 16 on one side of the engine to the opposite side of the main conduit section 12. Branch pipes 13 include straight portions 13a and arcuate portions 13b of approximately 110°–130°. This arrangement provides branch pipes of optimum length and shape to reduce the stress due to thermal expansion.

As seen in FIG. 1, the branch pipes 13 and 14 are secured to the main conduit section 12 slightly offset toward each other. This is accomplished by rotating the branch pipes about the axis of their straight portions prior to welding to the main conduit sections 12. Such construction adds stability to the manifold to eliminate excessive vibration and possible cracking at the welds and provides for thermal expansion as later described. The intake end of each branch pipe has an adapter 17 welded thereto. The adapter 17 has a radial flange 18 for abutment with bolting flange 15. A flexible gasket 19, between the cylinder head 16 and flange 18, provides a pressure tight connection upon tightening bolts 21. It should be observed that the sealing arrangement of the branch pipes to the cylinder heads is of considerable importance. The flange 18 is tightened against gasket 19 sufficient to effect a pressure tight seal but is not held rigid. The branch pipes, therefore, can rotate about the axis of their straight portions in response to thermal expansion of the main conduit sections 12 between adjacent branch pipes.

Referring now to FIG. 3, the details of the bellows and seal are shown. An annular sealing ring 22, welded near the forward end of each main conduit section 12, has a flexible bellows 23 welded thereto. The forward end of the bellows 23 is welded to an annular gasket ring 24 which is provided with a recess 25 for the reception of an asbestos-metallic gasket 26. The gasket is compressed between gasket ring 24 and gasket compression ring 27 secured to the rearward end of the adjacent main conduit section 12 to effect a seal between the main conduit sections. The radially outer ends of rings 24 and 27 are provided with tapered shoulders 28 and 29 respectively adapted for engagement with clamping ring 31. Annular band 32, having a nut and bolt tightening arrangement, indicated at 33 and 34 respectively, serves to force the clamping ring 31 radially inward to compress gasket 26. Since other gasket arrangements may be used within the spirit of the invention, no further detailed description of the seal assembly is deemed necessary.

During operation of the engine, the branch pipes 13 and 14 and main conduit sections 12 expand due to the high temperature of the exhaust gases. Expansion between adjacent main conduit sections 12 is permitted by the flexible bellows 23. Expansion of the main conduit sections between adjacent branch pipes tends to cause the branch pipes to rotate about the axis of their straight portions 13a and 14a to compensate for such expansion to prevent excessive stress at the welded joints. The stress at the joints is further reduced because the branch pipes are somewhat resilient due to their length and curvature. Vertical expansion between the main conduit and the engine is permitted by the crossover arrangement of the branch pipes. As the branch pipes expand, the main conduit will rise slightly without excessive stress at the welded joints. Since turbosupercharger T is secured to the engine, a separate bellows 35 is provided to compensate for the vertical expansion of the main conduit in relation to the turbosupercharger by harmless angular deflection of the bellows. The rearward end of the last main conduit section 12 is closed off by cover 36.

From the foregoing description, is has been shown that the described manifold assembly accomplishes many desired results. The novel arrangement results in a pressure tight manifold assembly which eliminates cracking due to thermal expansion and vibration during service operation. Furthermore, the components are interchangeable and can be removed and replaced independently of the rest of the assembly with small hand tools.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. In an exhaust manifold including a plurality of interchangeable component sections adapted to receive the exhaust gases from the cylinders of an internal combustion engine, a section comprising a main conduit portion; a normally rigid branch pipe extending from either side of and integral with said main conduit portion to the opposite side of said conduit portion in crossover relation, said branch pipes including a straight portion and an arcuate portion; a sealing flange on the end of each branch pipe; and clamping means for said flange, the length, curvature and crossover arrangement of said branch pipes being such that said pipes are relatively flexible to compensate for expansion of the assembly and reduce stress concentration at the joints between the main conduit and the branch pipes.

2. An exhaust manifold for an internal combustion engine having exhaust passages in its cylinder heads comprising a main conduit, said conduit including a plurality of longitudinally arranged sections, each section including a flexible bellows member and means to secure said sections in sealing relation; a plurality of integral normally rigid branch pipes extending from each side of said sections to the opposite side thereof; and clamping means to secure said branch pipes to the engine cylinder heads, said means permitting the pipes to rotate in response to longitudinal thermal expansion of the main conduit.

3. An exhaust manifold for an internal combustion engine having exhaust passages in its cylinder heads comprising a main conduit, said conduit including a plurality of longitudinally arranged sections, a flexible bellows member between adjacent sections, and means to secure said sections in sealing relation; a plurality of integral normally rigid branch pipes extending from each side of said sections to the opposite side thereof, the centerline planes of said pipes of each section being inclined toward each other from their inlet ends; and clamping means to secure said branch pipes to the engine cylinder heads, said means permitting the pipes to rotate in response to longitudinal thermal expansion of the main conduit.

4. An exhaust manifold for an internal combustion engine having exhaust passages in its cylinder heads comprising a main conduit, said conduit including a plurality of longitudinally arranged sections, a flexible bellows member between adjacent sections, and means to secure said sections in sealing relation; a plurality of integral normally rigid branch pipes extending from each side of said sections to the opposite side thereof; a radial flange on the end of each branch pipe; and means to seal each of said flanges on the cylinder heads, said means including a gasket between the flange and cylinder head, a clamping ring against said flange, and screw means threaded into the cylinder heads, the arrangement being such that expansion of the main conduit sections between adjacent branch pipes causes said pipes to rotate on the gaskets to compensate for such expansion.

5. An exhaust manifold for an internal combustion engine having exhaust passages in its cylinder heads comprising a main conduit, said conduit including a plurality of longitudinaly arranged sections, a flexible bellows member between adjacent sections, and means to secure said sections in sealing relation; a plurality of integral normally rigid branch pipes extending from each side of said sections to the opposite side thereof, each of said pipes including an arcuate portion adjacent the main conduit section and a straight portion on the end thereof, said arcuate portion exceeding 110°; and means to seal each of said flanges on the cylinder heads, said means including a gasket between the flange and cylinder head, a clamping ring against said flange, and screw means threaded into the cylinder heads, the arrangement being such that expansion of the main conduit sections between adjacent branch pipes causes said pipes to rotate on the gaskets to compensate for such expansion.

6. In an exhaust manifold including a plurality of interchangeable component sections adapted to receive the exhaust gases from the cylinders of an internal combustion engine, a section comprising a main conduit portion; a branch pipe extending from either side of said main conduit portion to the opposite side thereof in crossover relation, said branch pipes including a straight portion and an arcuate portion; a sealing flange on the end of each branch pipe; and clamping means for said flange, said means including a clamping ring against said flange, and screw means extending through the clamping ring, the arrangement being such that expansion of the main conduit portion between adjacent branch pipes causes said pipes to rotate to compensate for such expansion, the crossover arrangement and shape of said branch pipes being such that said pipes are relatively flexible to further compensate for thermal expansion and reduce stress concentration at the joints between the pipes and main conduit.

References Cited by the Examiner

UNITED STATES PATENTS

| | | | |
|---|---|---|---|
| 1,525,647 | 2/25 | Haughey | 285—368 X |
| 2,209,325 | 7/40 | Dennis | 285—300 |
| 2,653,836 | 9/53 | Christopherson et al. | 285—366 X |
| 2,660,031 | 11/53 | Tromel | 60—29 |
| 2,681,817 | 6/54 | Demlow | 285—368 X |
| 3,043,094 | 7/62 | Nichols | 60—29 |

FOREIGN PATENTS 392,852   5/33   Great Britain.

EDGAR W. GEOGHEGAN, *Primary Examiner.*
ABRAM BLUM, *Examiner.*